D. Porter.

Sheep Rack.

N°. 57,965. Patented Sep. 11, 1866.

Witnesses:
W. H. Burridge
J. Holmes

Inventor:
D'Arcy Porter

N. PETERS, PHOTO-LITHOGRAPHER, WASHINGTON, D.C.

UNITED STATES PATENT OFFICE.

D'ARCY PORTER, OF CLEVELAND, OHIO.

IMPROVED SHEEP RACK AND SHED COMBINED.

Specification forming part of Letters Patent No. 57,965, dated September 11, 1866.

*To all whom it may concern:*

Be it known that I, D'ARCY PORTER, of Cleveland, in the county of Cuyahoga and State of Ohio, have invented new and useful Improvements in Sheep Rack and Shed Combined; and I do hereby declare that the following is a full and complete description of the construction and operation of the same, reference being had to the accompanying drawings, making part of this specification, in which—

Figure 1:
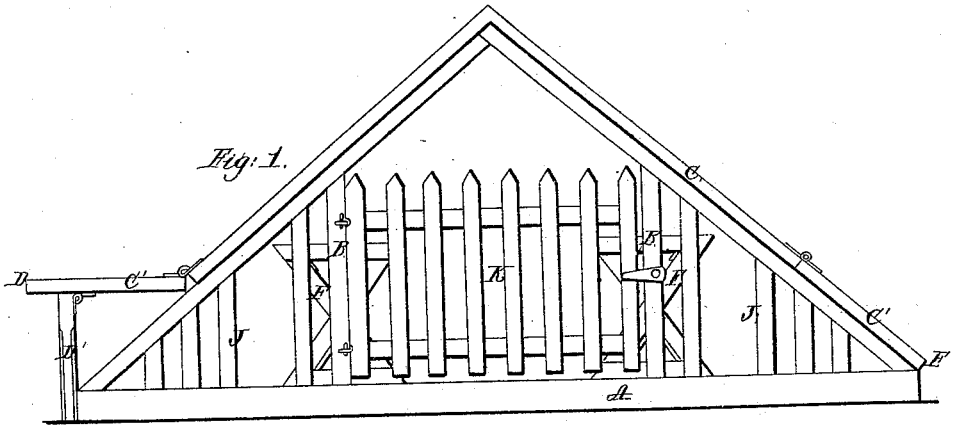
Figure 2:
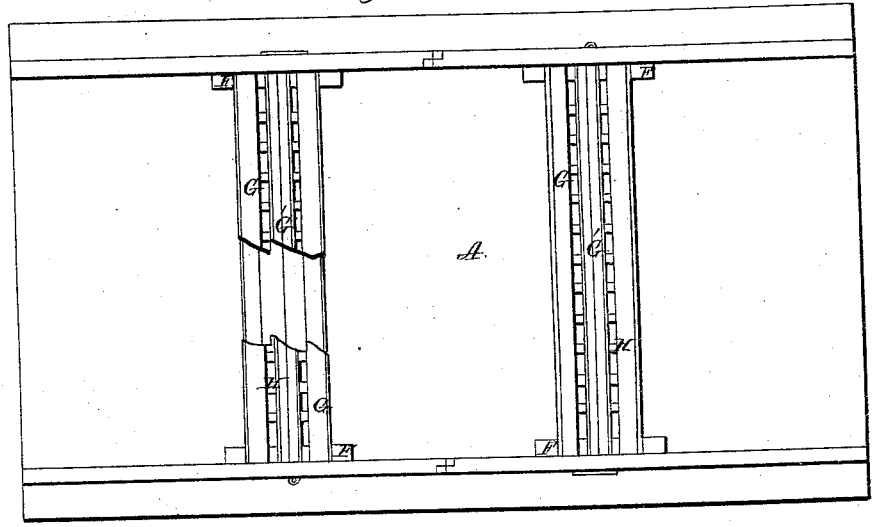
Figure 4:
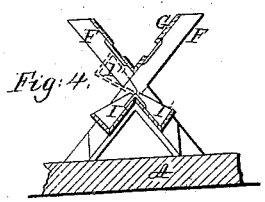
Figure 3:
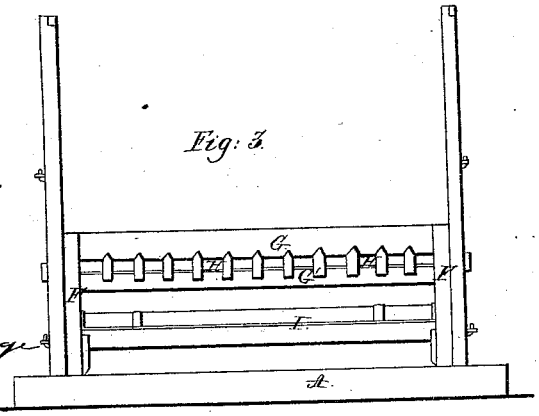

Figure 1 is an end view. Fig. 2 is a top view with the cover removed. Figs. 3 and 4 are sectional views.

Like letters refer to like parts.

My invention relates to such a structure as to make it convenient to distribute the feed, and to form the structure at pleasure into an open or closed shed.

A represents a floor, which may be of any desired dimensions.

B B represent posts which support the roof. These posts are situated at about one-third of the distance from each corner, as seen in Fig. 1.

The roof is represented at C C C' C'. That part shown at C C occupies about three-fourths of the whole area, forming a ridge at the center high enough for a man to stand erect beneath it.

The sections C' C' of the roof are hinged in a line parallel with the ridge, and when raised, as shown at D in Fig. 1, are supported in their raised position by the post D', which is hinged as shown, so as to fold inward when the roof is let down, as shown at E, Fig. 1.

The section C', when raised, is sufficiently high to allow sheep to pass under without obstruction.

The feed-racks are placed parallel to the ridge of the roof, and about one-third of the whole width from the end, and are intended to be occupied on both sides.

The end pieces F of the rack cross in form of an X, the upper ends being provided with longitudinal bars G G', and which are placed about four inches apart, the space between them being occupied by short slats H, thus forming the openings through which the sheep draw the hay, which is placed in the space G G'.

I I' represent grain or feed troughs, that are shown at Fig. 4. I is permanently attached to the pieces F, as shown in the figure. The opposite one, I', is hinged at the upper edge, so that it can be turned over to the position indicated by the dotted lines I'' in Fig. 4.

The object of the arrangement is to enable the attendant to fill both troughs I and I' from the space between the two racks. In order to do this, the trough I' is first supplied. It is then turned over to the position of I'', by which means the grain is discharged into trough I, and trough I' is returned to its original position empty, when it can be again filled for the sheep upon the inside.

Both ends of the fold are provided with bars or pickets and a door or gate, as shown at J K, Fig. 1, so that by closing the gates the sheep will be protected from disturbance from vicious animals.

What I claim as my improvement, and desire to secure by Letters Patent, is—

A sheep rack and fold, constructed substantially as and for the purpose as herein set forth.

D'ARCY PORTER.

Witnesses:
 W. H. BURRIDGE,
 FRANK ALDEN.